United States Patent
Ho et al.

(10) Patent No.: US 7,613,451 B1
(45) Date of Patent: Nov. 3, 2009

(54) TELEPHONE IDENTITY ASSOCIATION AND A METHOD OF DISTRIBUTING TELEPHONE IDENTITY ASSOCIATION TO TELEPHONE SYSTEMS

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 28 days.

(21) Appl. No.: 11/171,822

(22) Filed: Jun. 29, 2005

(51) Int. Cl.
*H04M 3/42* (2006.01)

(52) U.S. Cl. .............. 455/415; 455/414.1; 455/417; 455/445; 379/201.05; 379/201.12; 379/207.03

(58) Field of Classification Search ............ 379/220.01, 379/221.14, 230, 220.02, 415, 142.07, 221.05, 379/221.02, 201.12, 201.05, 207.03; 455/426.2, 455/426.1, 415, 445, 448, 411, 418, 419, 455/551, 552.1, 435.2, 432.1, 417, 440, 459, 455/414.1
See application file for complete search history.

(56) References Cited

U.S. PATENT DOCUMENTS

| | | | | |
|---|---|---|---|---|
| 5,949,865 | A * | 9/1999 | Fusinato ................. | 379/221.09 |
| 6,130,941 | A * | 10/2000 | Nimmagadda et al. ...... | 379/230 |
| 6,243,574 | B1 * | 6/2001 | McGregor et al. .......... | 455/418 |
| 6,393,288 | B1 * | 5/2002 | Sollee et al. ................ | 455/445 |
| 6,738,630 | B2 * | 5/2004 | Ashmore .................. | 455/456.3 |
| 6,748,209 | B2 * | 6/2004 | Lipsit ........................ | 455/411 |
| 6,898,278 | B1 * | 5/2005 | Li et al. ...................... | 379/325 |
| 7,042,994 | B2 * | 5/2006 | Hanna et al. ........... | 379/121.02 |
| 7,050,810 | B2 * | 5/2006 | Brusilovsky et al. ........ | 455/445 |
| 7,099,657 | B2 * | 8/2006 | Le Gendre et al. .......... | 455/415 |
| 7,116,974 | B2 * | 10/2006 | Begeja et al. ................ | 455/417 |
| 2002/0068577 | A1 * | 6/2002 | Balogh et al. ............... | 455/452 |
| 2002/0116464 | A1 * | 8/2002 | Mak ........................... | 709/206 |
| 2003/0134648 | A1 * | 7/2003 | Reed et al. .................. | 455/456 |
| 2004/0236849 | A1 * | 11/2004 | Cooper et al. ............... | 709/224 |
| 2005/0041787 | A1 * | 2/2005 | Casey et al. ............. | 379/88.18 |
| 2005/0105512 | A1 * | 5/2005 | Myhre et al. ................ | 370/352 |
| 2006/0177038 | A1 * | 8/2006 | Horton .................. | 379/221.13 |

* cited by examiner

*Primary Examiner*—George Eng
*Assistant Examiner*—Brandon J Miller
(74) *Attorney, Agent, or Firm*—Michele Liu Baillie; North Shore Patents, P.C.

(57) ABSTRACT

Embodiments of the present invention include methods of distributing telephone identity associations among multiple telephone systems in a telephone network. In one embodiment, the present invention includes methods of distributing, receiving, redistributing and withdrawing telephone identity association data, telephone system association data and other data within in a network of telephone identity association processors. In another embodiment, the present invention includes automated, semi-automated and manual methods to initiate distribution of telephone identity association data.

20 Claims, 6 Drawing Sheets

TELEPHONE IDENTITY ASSOCIATION AND A METHOD OF DISTRIBUTING TELEPHONE IDENTITY ASSOCIATION TO TELEPHONE SYSTEMS

BACKGROUND

1. Field

This invention relates to the field of telecommunications, and in particular, a method of distributing telephone identity associations to one or more telephones systems in a telephone network.

2. Related Art

A typical telephone network, such as the Public Switched Telephone Network (PSTN) or a corporate telephone network, comprises one or more telephone systems. Each telephone system within a telephone network is assigned to handle a certain set of telephone numbers. Within a given telephone system, each telephone number can be assigned to a telephone. A user (caller) can uses his telephone to dial the telephone number of another user (callee). Often the telephones of the caller and the callee are connected to two different telephone systems within the telephone network. For example, it is possible that the caller is on the West coast using a local telephone system and the callee is on the East coast using yet another local telephone system. In order to complete such a call, it is common for the call to be routed through a number of telephone systems before reaching the telephone system responsible for handling the telephone number associated with the callee's telephone. For each call, all participating telephone systems within the telephone network must determine whether or not it is responsible for the called telephone number or whether the call should be passed on to another telephone system based on the telephone number dialed and other factors and attributes of the telephone number. In the event that a given telephone system is responsible for handling a given telephone call, then the telephone system will connect the call to the telephone associated with that particular telephone number.

To properly route a call, each telephone system within a telephone network needs a way to determine which telephone system can reach a particular telephone number. According to the current state of the art, a typical solution is to manually configure every telephone system with all possible associations of telephone numbers and telephone systems. This means that for every valid telephone number there would need to be a record with that telephone number and the telephone system with which it is associated. The drawback with manual configuration of each telephone systems is that when a telephone system adds, changes, or deletes a telephone number or a range of telephone numbers, the new information is not automatically shared with other telephone systems. The administrative authority of the telephone system making changes must inform the administrative authority of other telephone systems to make corresponding changes. Such procedures are often completely manual, error-prone process and expensive to maintain and expand.

The manual change process described above can be acceptable when changes are infrequent or where telephone systems and telephone numbers are added, deleted or changed only once in a great while. However, the recent adoption of Voice Over IP (VoIP) services, telephone number portability services, and mobile telephone services, has spurred rapid expansion of the number and variety of telephone systems and a surge in changes to telephone identity associations which describe and define the association between telephone numbers to telephone systems. Manual methods of managing telephone identity associations become significant bottlenecks and represent significant costs to maintain existing services and roll out new voice and communication services.

A typical telephone network comprises multiple telephone systems. Each telephone system in a telephone network has a telephone system identity that uniquely identifies that particular telephone system. FIG. 1 illustrates a telephone system in a telephone network. A telephone system 100 can connect to other telephone system 190. Each other telephone system 190 is a telephone system.

Telephone system 100 can connect to one or more user terminals 110. Telephone system 100 connects to user terminal 110 when a user plugs user terminal 110 to a wall telephone jack of telephone system 100. Similarly, telephone system 100 disconnects from user terminal 110 when a user unplugs user terminal 110 from a wall telephone jack of telephone system 100. In certain scenarios, telephone system 100 connects to user terminal 110 when user terminal 110 registers with telephone system 100. Similarly, telephone system 100 disconnects from user terminal 110 when user terminal 110 deregisters from telephone system 100. Often telephone system 100 can determine that telephone system 100 connects to user terminal 110 when telephone system 100 detects certain signals from user terminal 110. The signals can be part of an automatic discovery procedure. In another scenarios, telephone system 100 determines that telephone system 100 disconnects from user terminal 110 based on certain criteria. Such criteria can include, but is not limited to, the loss of communication between telephone system 100 and user terminal 110 for 10 or 50 minutes.

A user terminal 110 can have one or more telephone numbers. Often an operator of telephone system 100 assigns a telephone number to a user terminal. A telephone number becomes reachable by telephone system 100 when an operator provisions the telephone number in telephone system 100. Likewise, a telephone number becomes unreachable by telephone system 100 when an operator deletes the telephone number from telephone system 100. It is also possible for a telephone number to become reachable by telephone system 100 when a user terminal 110 that has the telephone number connects to telephone system 100. The same is true of the reverse; a telephone number becomes unreachable by telephone system 100 when a user terminal 110 that has the telephone number disconnects from telephone system 100.

User terminal 110 includes components that allow a user to place calls to and receive calls from other users using other user terminals. User terminal 110 can be a residential telephone, a mobile telephone, a corporate desk telephone, or a personal computer running a telephony application equipped with a speaker and a microphone. User terminal 110 can connect to telephone system 100 over various telephony technologies, such as POTS, ISDN-BRI, GSM, CDMA, SIP, H.323, or proprietary digital set protocols.

A user can use user terminal 110 to enter a telephone number to make a call. User terminal 110 sends a call request to telephone system 100 for call processing. The call request includes, but is not limited to, the telephone number. Telephone system 100 includes functionality to process a call request. Telephone system 100 retrieves the telephone number included in the call request and determines how to complete the call request. In certain implementations, telephone system 100 can be an IP-PBX (IP-Private Branch Exchange), a Class 5 switch, a Class 4 switch, a tandem switch or a PBX. In a different scenario, telephone system 100 receives a call request from an other telephone system 190. Telephone system 100 handles the call request in a similar manner.

The above illustrates the need for a method of automatically distributing telephone identity associations of a telephone system to other telephone systems in a telephone network.

SUMMARY

Embodiments of the present invention include methods of distributing and receiving telephone identity associations among telephone identity association processors connected to one or more telephone systems.

In one embodiment, the present invention includes a telephone identity association comprising a telephone number attribute and a telephone system identity attribute, wherein said telephone system identity attribute indicates the telephone system that can reach the telephone number indicated in the telephone number attribute.

In another embodiment, the present invention includes a method of distributing telephone identity associations comprising providing for one or more telephone identity associations, providing for one or more telephone identity association processors, and notifying up to all of said telephone identity association processors of up to all telephone identity associations, wherein said telephone identity associations comprise a telephone number attribute, a telephone system identity attribute and additional attributes.

In yet another embodiment, the present invention includes a method of receiving telephone identity associations comprising providing for one or more telephone identity associations, providing for one or more telephone identity association processors, establishing communications among up to all of said telephone identity association processors, and updating up to all telephone identity associations with data from one or more other telephone identity association processors.

Additional embodiments will be evident from the following detailed description and accompanying drawings, which provide a better understanding of the nature and advantages of the present invention.

DETAILED DESCRIPTION

Described herein are methods of distributing telephone identity associations amongst telephone systems within a telephone network. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Telephone Identity Associations and Telephone Identity Association Processors

Figure 1:
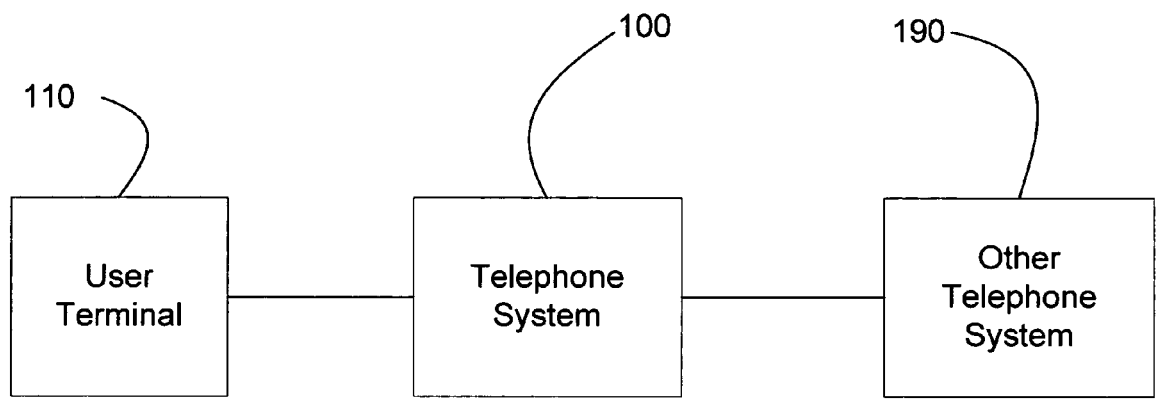
FIG. 1 is a block diagram illustrating a typical telephone network according the current state of the art.
Figure 2:
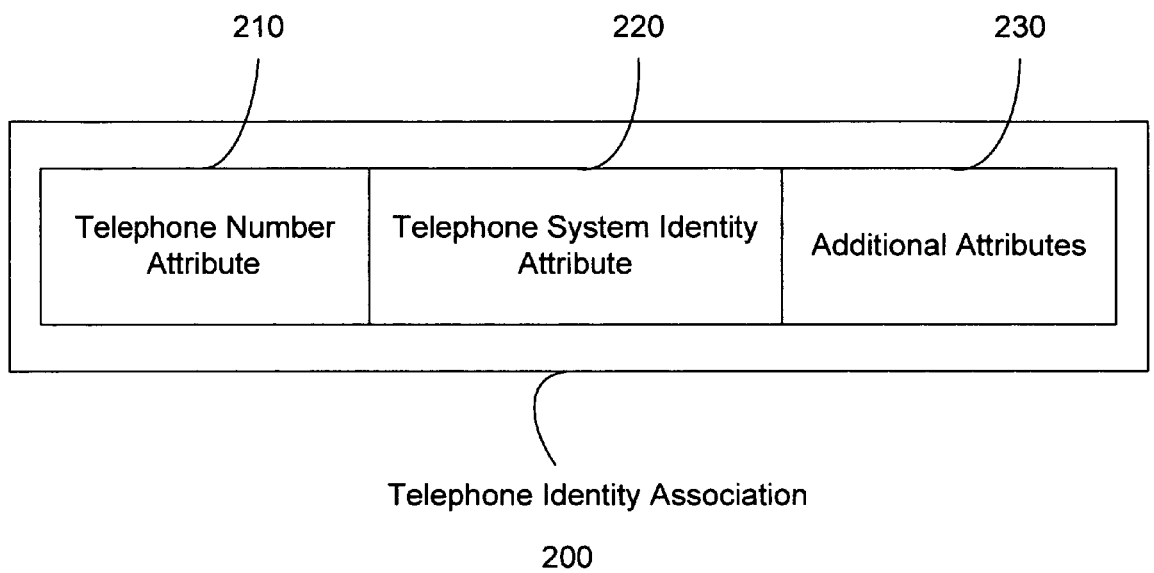
FIG. 2 is a block diagram illustrating a telephone identity association according to one embodiment of the present invention.

FIG. 2 illustrates a telephone identity association according to one embodiment of the present invention. As used herein, telephone identity associations refer to any linkage of a telephone number to data used by one or more telephone systems to determine how that particular telephone number can be reached. Telephone identity association 200 includes telephone number attribute 210, telephone system identity attribute 220 and additional attribute 230. In one embodiment, the telephone number attribute 210 is a telephone number. In another embodiment, the telephone system identity attribute 220 is the telephone system identity of a telephone system. In one embodiment, the telephone number attribute 210 is a telephone number of a user terminal that connects to the telephone system with the telephone system identity indicated in the telephone system identity attribute 220.

In one embodiment, additional attributes 230 include a time marker. In one embodiment, a time marker includes a reachable time when the telephone number in telephone number attribute 210 is reachable by the telephone system indicated in the telephone system identity attribute 220. In another embodiment, a time marker includes a creation time. In such an embodiment, when multiple telephone identity associations have identical telephone number attributes, the telephone identity association with the most recent creation time supersedes the other telephone identity associations. In one embodiment, a telephone system determines the creation time. In another embodiment, a telephone identity association processor determines the creation time. In a different embodiment, an operator specifies the creation time.

Figure 3:
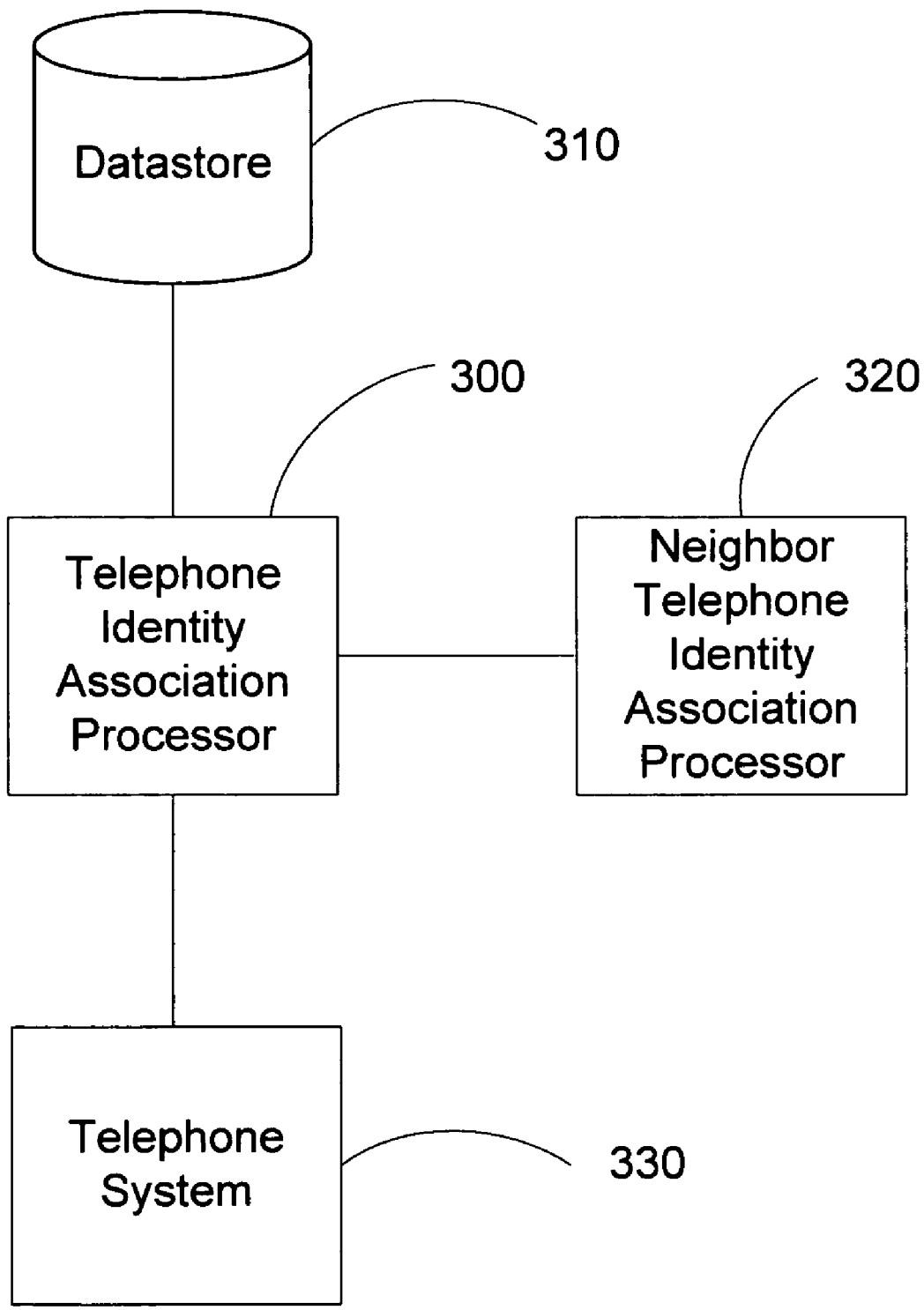
FIG. 3 illustrates the connections of a telephone identity association processor with other components according to one embodiment of the present invention.

FIG. 3 illustrates the connections of a telephone identity association processor with other components. Telephone identity association processor 300 connects to a datastore 310. Datastore 310 stores a plurality of telephone identity associations. The telephone identity association processor 300 connects to one or more telephone system 330. In one embodiment, a telephone system 330 notifies telephone identity association processor 300 of the telephone system identity that identifies the telephone system 330, a plurality of telephone numbers that telephone system 330 can reach, and the times when each of the telephone numbers is reachable by telephone system 330. For each of the telephone numbers, telephone identity association processor 300 creates a telephone identity association 200 in datastore 310 with telephone number attribute 210 set to the telephone number, telephone system identity attribute 220 set to the telephone system identity of telephone system 330. In one embodiment, telephone identity association processor 300 sets the time marker for the telephone identity association. Telephone identity association processor 300 sets the reachable time to the time when the telephone number is reachable by telephone system 330. In one embodiment, telephone identity association processor 300 sets the creation time to the time when the telephone identity association is created. In another embodiment, the telephone system 330 includes a creation time for each of the telephone numbers reachable by the telephone system 330. Telephone identity association processor 300 sets the creation time to the creation time from the telephone system 330.

In another embodiment, an operator submits to telephone identity association processor 300 the telephone system identity of a telephone system 330, a plurality of telephone numbers that telephone system 330 can reach, and the times when each of the telephone numbers is reachable by telephone system 330. For each of the telephone numbers, telephone identity association processor 300 creates a telephone identity association 200 in datastore 310 with telephone number attribute 210 set to the telephone number, telephone system identity attribute 220 set to the telephone system identity of telephone system 330. In one embodiment, telephone identity association processor 300 sets the time marker for the telephone identity association. Telephone identity association processor 300 sets the reachable time to the time when the telephone number is reachable by telephone system 330. In one embodiment, telephone identity association processor 300 sets the creation time to the time when the telephone identity association is created. In another embodiment, the operator specifies a creation time for each of the telephone numbers reachable by the telephone system 330. Telephone identity association processor 300 sets the creation time to the creation time specified by the operator.

Telephone identity association processor 300 can connect to one or more neighbor telephone identity association processor 320. Each neighbor telephone identity association processor 320 is itself a telephone identity association processor. Once connected, a plurality of telephone identity association processors forms a network that exchanges telephone identity associations. A telephone identity association processor identity uniquely identifies each neighbor telephone identity association processor 320 within the network of telephone identity association processors. In one embodiment, the telephone identity association processor identities are stored in the programming logic of telephone identity association processor 300. In another embodiment, the telephone identity association processor identities are stored in datastore 310. In another embodiment, an operator notifies the telephone identity association processor 300 of the telephone identity association processor identity for each of the neighbor telephone identity association processors 320. In yet another embodiment, the telephone identity association processor 300 detects neighbor telephone identity association processors 320 by means of an automatic discovery process. Telephone identity association processor 300 can create a telephone identity association processor identity for each of the neighbor telephone identity association processors.

Figure 4:
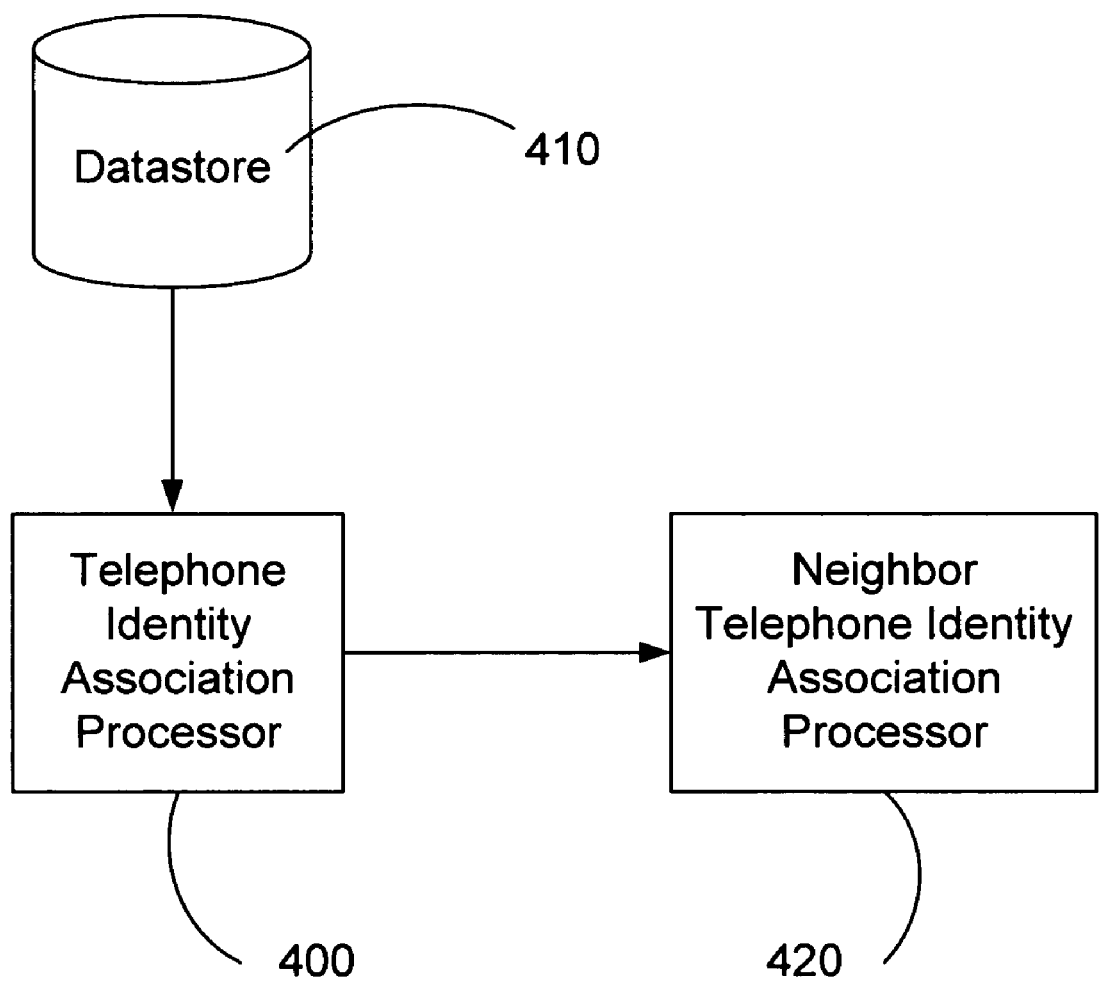
FIG. 4 illustrates a method of distributing a telephone identity association to a neighbor telephone identity association processor according to one embodiment of the present invention.

Distributing Telephone Identity Associations to Neighbor Telephone Identity Association Processors FIG. 4 illustrates a method of distributing a telephone identity association to a neighbor telephone identity association processor. In one embodiment, telephone identity association processor 400 retrieves a telephone identity association processor identity. Telephone identity association processor 400 establishes a communication session with neighbor telephone identity association processor 420 identified by the telephone identity association processor identity. Telephone identity association processor 400 retrieves a telephone identity association from datastore 410, and sends the telephone identity association to the neighbor telephone identity association processor 420 over the communication session. Telephone identity association processor 400 repeats the above steps until it completes distributing up to all telephone identity associations in datastore 410 to up to all neighbor telephone identity association processors.

In one embodiment, telephone identity association processor 400 terminates the communication session with the neighbor telephone identity association processor 420. In another embodiment, telephone identity association processor 400 does not terminate the communication session with the neighbor telephone identity association processor 420. In one embodiment, the option to maintain or terminate a communication session is dependent on the type, style and bandwidth of the telephone identity association processor network.

In one embodiment, telephone identity association processor 400 establishes communication sessions with all neighbor telephone identity association processors before distributing telephone identity associations to the neighbor telephone identity association processors. In another embodiment, telephone identity association processor 400 establishes a communication session with a neighbor telephone identity association processor after distributing some telephone identity association to some neighbor telephone identity association processor.

In one embodiment, a telephone service provider publishes a telephone service description to a Universal Description, Discovery and Integration (UDDI) business registry, also known as UBR. Such registries can act as a clearinghouse or a repository of telephone identity associations from which neighbor telephone identity association processors can receive updates of up to all new and changed telephone identity associations made in some period of time in up to all participating telephone systems. The UDDI can also accept submissions from up to all participating telephone systems when changes or updates are made to that particular system. The information can then be shared with other participating telephone identity association processors.

In one embodiment, the published service description includes service binding information and data format for accessing the service. In one embodiment, the data format includes the description of the telephone identity association. A second telephone service provider that wishes to use the published telephone service obtains from the UBR the service description, including the data format of the telephone identity association. The second telephone service provider uses the obtained service description to exchange telephone identity association with the first telephone service provider.

Figure 5:
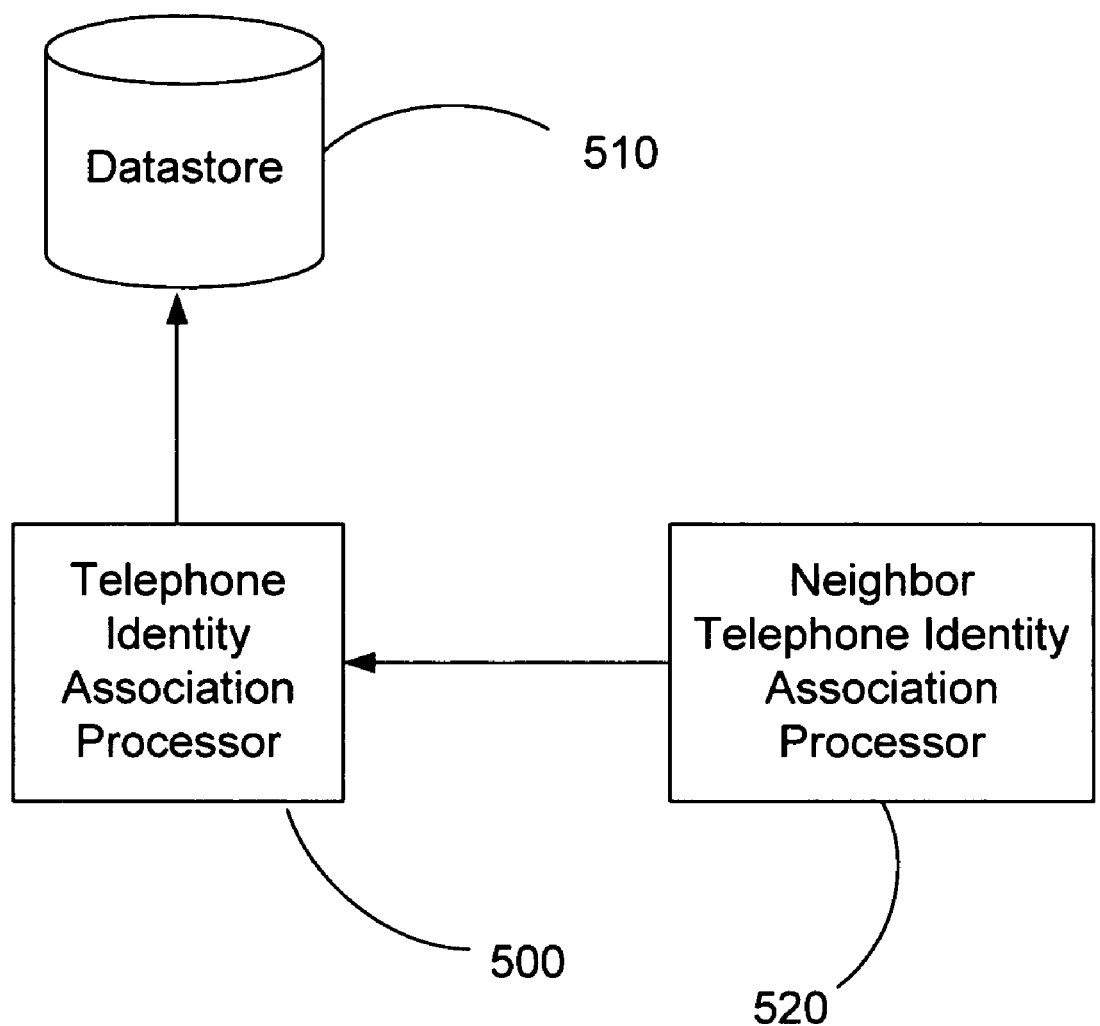
FIG. 5 illustrates a method of receiving a telephone identity association from a neighbor telephone identity association processor according to one embodiment of the present invention.

Receiving Telephone Identity Association from Neighbor Telephone Identity Association Processors FIG. 5 illustrates a process to receive a telephone identity association from a neighbor telephone identity association processor according to one embodiment of the present invention. In one embodiment, telephone identity association processor 500 retrieves a telephone identity association processor identity. Telephone identity association processor 500 establishes a communication session with the neighbor telephone identity association processor 520 identified by the telephone identity association processor identity. In one embodiment, telephone identity association processor 500 receives a telephone identity association over the communication session with the neighbor telephone identity association processor 520. In one embodiment, telephone identity association processor 500 determines that datastore 510 does not have a telephone identity association that is identical to the received telephone identity association. Telephone identity association processor 500 stores the received telephone identity association in datastore 510. In another embodiment, telephone identity association processor 500 determines that datastore 510 has a telephone identity association that is identical to the received telephone identity association. In one embodiment, telephone identity association processor 500 discards the received telephone identity association. In another embodiment, telephone identity association processor 500 replaces the identical telephone identity association in datastore 510 with the received telephone identity association. In one embodiment, telephone identity association processor 500 continues one or more of the above process until the neighbor telephone identity association processor 520 indicates that it has sent all telephone identity association. In one embodiment, telephone identity association processor 500 terminates the communication session with neighbor telephone identity association processor 520. In another embodiment, telephone identity association processor 500 does not terminate the communication session with the neighbor telephone identity association processor 520.

Telephone identity association processor 500 retrieves another telephone identity association processor identity. Telephone identity association processor 500 establishes a communication session with the neighbor telephone identity association processor 520 identified by the retrieved telephone identity association processor identity. Telephone identity association processor 500 repeats a similar process to receive all the telephone identity association from the neighbor telephone identity association processor 520.

Telephone identity association processor 500 repeats a process similar to that described above with up to all neighbor telephone identity association processor 520 identified by up to all remaining stored telephone identity association processor identities.

In one embodiment, telephone identity association processor 500 establishes communication sessions with up to all neighbor telephone identity association processor before receiving telephone identity association from a neighbor telephone identity association processor. In another embodiment, telephone identity association processor 500 establishes a communication session with a neighbor telephone identity association processor after receiving some telephone identity association from some other neighbor telephone identity association processor.

Redistributing Telephone Identity Associations

With reference to FIG. 4, telephone identity association processor 400 executes a process to distribute all telephone identity association in datastore 410 to all neighbor telephone identity association processor 420. In one embodiment, an operator schedules the frequency to repeat the process, for example, every 3 minutes, every 10 minutes, or hourly at the hour. In another embodiment, telephone identity association processor 400 executes the process when there is a new telephone identity association received by telephone identity association processor 400. In yet another embodiment, telephone identity association processor executes the process when there is a new neighbor telephone identity association processor introduced to telephone identity association processor 400.

In one embodiment, telephone identity association processor 400 receives a new telephone identity association. In one embodiment, telephone identity association processor distributes up to all the new telephone identity associations to up to all neighbor telephone identity association processors 420 immediately. In another embodiment, telephone identity association processor 400 distributes up to all telephone identity associations in datastore 410 to up to all neighbor telephone identity association processors 420 immediately. In yet another embodiment, telephone identity association processor 400 distributes all telephone identity associations in datastore 410 to up to all neighbor telephone identity association processors 420 at the next scheduled time.

In one embodiment, telephone identity association processor 400 has stored a new telephone identity association processor identity. In one embodiment, telephone identity association processor 400 distributes up to all telephone identity associations in datastore 410 to the neighbor telephone identity association processor 420 identified by the new telephone identity association processor identity immediately. In another embodiment, telephone identity association processor 400 distributes up to all telephone identity associations in datastore 410 to up to all neighbor telephone identity association processors 420 at the next scheduled time.

A New Telephone Number is Reachable by a Telephone System

In one embodiment, with reference to FIG. 3, a telephone number is reachable by telephone system 330. Telephone system 330 notifies telephone identity association processor 300 of the telephone system identity that identifies telephone system 330, the telephone number, and the time when the telephone number is reachable by telephone system 330. Telephone identity association processor 300 creates a telephone identity association in datastore 310 with telephone number attribute set to the telephone number, telephone system identity attribute set to the telephone system identity of telephone system 330. Telephone identity association processor 300 sets the time marker for the created telephone identity association as illustrated in FIG. 3.

In another embodiment, an operator submits to telephone identity association processor 300 the telephone system identity of a telephone system 330, a telephone number that is reachable by telephone system 330, and the time when the telephone number is reachable by telephone system 330. Telephone identity association processor 300 creates a telephone identity association in datastore 310 with telephone number attribute set to the telephone number, telephone system identity attribute set to the telephone system identity of telephone system 330. Telephone identity association processor 300 sets the time marker for the created telephone identity association as illustrated in FIG. 3.

Determining if a Telephone Number is Reachable

Figure 6:
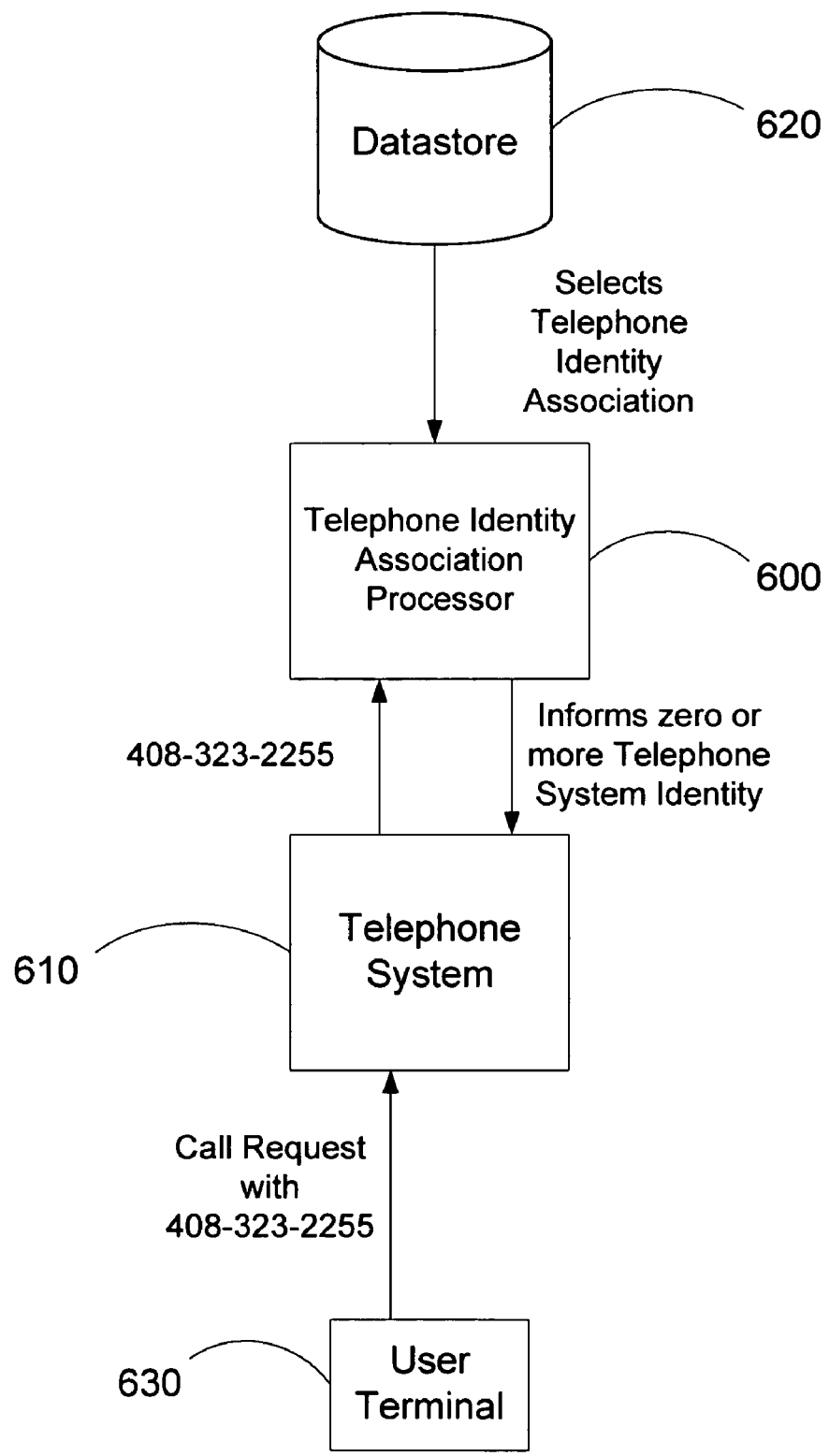
FIG. 6 illustrates a method of determining if a telephone number is reachable according to one embodiment of the present invention.

FIG. 6 illustrates a method of determining if a telephone number is reachable according to one embodiment of the present invention. To place a call a user enters a telephone number at user terminal 630. For example, the telephone number can be a ten-digit U.S. number such as: 408-323-2255. In on embodiment, user terminal 630 sends a call request to telephone system 610. The call request would include the telephone example telephone number 408-323-2255. In one embodiment, telephone system 610 determines how to route the call based on telephone number. In one embodiment, telephone system 610 sends telephone number to telephone identity association processor 600.

In one embodiment, telephone identity association processor 600 selects from datastore 620 a plurality of telephone identity associations with telephone number attribute matching the telephone number.

In one embodiment, telephone identity association processor 600 sends the selected plurality of telephone identity associations to telephone system 610. Telephone system 610 determines the appropriate telephone system by which the telephone number is reachable.

In another embodiment, among the selected telephone identity associations, telephone identity association processor 600 chooses a telephone identity association based on the time marker.

In an embodiment, telephone identity association processor 600 chooses a telephone identity association that has the most recent creation time. In another embodiment, telephone identity association processor 600 chooses a telephone identity association that has the most recent start time of the reachable time. Telephone identity association processor 600 informs telephone system 610 of the chosen telephone identity associations. In one embodiment, Telephone identity association processor 600 informs telephone system 610 of the telephone system identity of the chosen telephone identity associations.

In one embodiment, the telephone system 610 includes a request time to indicate when to send the telephone number to telephone identity association processor 600. Telephone identity association processor 600 chooses a plurality of telephone identity associations whose reachable times include the request time. Telephone identity association processor 600 may further choose a telephone identity association that has the most recent creation time. Telephone identity association processor 600 informs telephone system 610 of the chosen telephone identity associations. In one embodiment, telephone identity association processor 600 informs telephone system 610 of the telephone system identity of the chosen telephone identity associations.

Telephone Identity Association Distribution Revisited

In a telephone network, different telephone identity association processors may belong to different administrative, departmental, business and government entities. Due to business, management, security or other reasons, telephone identity association processor 400 can select from datastore 410 a subset of telephone identity associations to distribute to neighbor telephone identity association processors 420. In one embodiment, telephone identity association processor 400 selects telephone identity association with telephone number attribute within one or more ranges of telephone numbers. In one embodiment, an operator sets up one or more ranges of telephone numbers. In another embodiment, telephone identity association processor 400 determines one or more ranges of telephone numbers based on programming logic. In one embodiment, telephone identity association processor 400 selects telephone identity association with telephone system identity attribute matching a set of telephone system identity. In one embodiment, an operator sets up the set of telephone system identity. In another embodiment, telephone identity association processor 400 determines the set of telephone system identity based on programming logic. In a different embodiment, telephone identity association processor 400 distributes a different subset of telephone identity associations to each of the neighbor telephone identity association processor 420. In one embodiment, an operator sets up the subset of telephone identity associations for each of the neighbor telephone identity association processors 420. In yet another embodiment, telephone identity association processor 400 selects telephone identity associations based on a combination of criteria.

Datastore Capacity Management

In one embodiment, telephone identity association processor keeps all telephone identity associations in datastore. In another embodiment, telephone identity association processor keeps a plurality of telephone identity association in datastore based on certain criteria.

In one embodiment, telephone identity association processor keeps a plurality of telephone identity associations with the top most recent creation times in the time marker, and with the same telephone number in the telephone number attribute. In one embodiment, telephone identity association processor keeps the telephone identity associations with the top 10 most recent creation times. In another embodiment, telephone identity association processor keeps the telephone identity associations with the top 30 most recent creation times.

In one embodiment, telephone identity association processor keeps a plurality of telephone identity associations when datastore capacity is below a threshold, for example, at 90% capacity, or at 80% capacity. In one embodiment, telephone identity association processor keeps the plurality of telephone identity association based on user input. In a different embodiment, telephone identity association processor keeps a plurality of telephone identity associations for some predetermined period of time, for example every 2 hours, every 4 hours, or every 3 days.

Other Attributes in Telephone Identity Association

In one embodiment, in telephone identity association 200, telephone number attribute 210 is a range of telephone numbers. In one embodiment, in telephone identity association 200, additional attributes 230 includes other attributes. In one embodiment, additional attributes 230 includes the telephone identity association processor identity of the telephone identity association processor that distributes telephone identity association 200. In another embodiment, additional attributes 230 includes contact information for the administrator that operates the telephone identity association processor that distributes telephone identity association 200. In another embodiment, additional attributes 230 includes charging information for the telephone system identified by the telephone system identity in telephone system identity attribute 220. In one embodiment, the charging information is based on time of day. In another embodiment, the charging information is based on the days of the week. In one embodiment, additional attributes 230 includes rules that restrict access to the telephone system identified by the telephone system identity in telephone system identity attribute 220. In one embodiment, the rules specify the time of day to restrict access to the telephone system. In another embodiment, the rules specify the days of the week to restrict access to the telephone system. In yet another embodiment, the rules specify access restriction to the telephone system for certain class of service. In one embodiment, the class of service is associated with a user terminal. In another embodiment, the class of service is associated with a telephone number.

In one embodiment, additional attributes 230 includes capability for the telephone system. In one embodiment, the capability includes a plurality of codecs supported by the telephone system. In another embodiment, the capability includes a plurality of call signaling protocols supported by the telephone system.

In one embodiment, additional attributes 230 includes quality of service for the telephone system. In one embodiment, the quality of service includes voice call latency for the telephone system. In another embodiment, the quality of service includes call completion rate for the telephone system. In a different embodiment, additional attributes 230 includes security for the telephone system. In one embodiment, the security includes a plurality of voice call encryption methods for the telephone system. In another embodiment, the security includes a plurality of proprietary codecs for the telephone system. In one embodiment, additional attributes 230 includes a list of features that the telephone system offers. In another embodiment, additional attributes 230 includes charging information for the features that the telephone system offers.

In a different embodiment, additional attributes 230 includes the telephone system identity of various alternate telephone systems that can either assist or provide overflow relief for call handling. For example, if one or more telephone systems get over loaded with call traffic during an emergency situation, alternate telephone systems listed in the additional attributes 230 can help reroute calls through less congested paths, thus helping to ensure the reliability of the telecommunications network.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method of distributing telephone identity associations comprising:
    providing for a plurality of telephone identity association processors of a plurality of telephone systems for routing calls;
    providing for one or more telephone identity associations by a telephone identity association processor of the plurality of telephone identity association processors;
    wherein each of said telephone identity associations comprise a telephone number attribute and a telephone system identity attribute,
        the telephone number attribute comprising a telephone number of a user terminal, and
        the telephone system identity attribute comprising an identity of a telephone system to which the user terminal connects for making or receiving a call, wherein the telephone system is able to route a call to the user terminal with the telephone number; and
    distributing said telephone identity associations to each of said plurality of telephone identity association processors prior to a routing of the call to the telephone number from any of the plurality of telephone systems to the telephone system identified in the telephone system identity attribute.

2. The method of claim 1 wherein each of the telephone identity associations further comprises additional attributes comprising a time marker indicating the time or date the telephone system indicated in said telephone system identity attribute begins to be able to route the call to the user terminal with the telephone number indicated in said telephone number attribute.

3. The method of claim 1 wherein said providing for telephone identity association comprises providing for an updated telephone identity association whenever the telephone system, to which the user terminal with the telephone number is connected for making or receiving the call, is changed.

4. The method of claim 2 wherein said time marker indicates the creation time of the telephone identity association.

5. The method of claim 1 wherein said distributing occurs automatically after a predetermined period of time.

6. The method of claim 1 further comprising providing for a datastore.

7. The method of claim 1 wherein said distributing occurs automatically after changes are made to at least one of said telephone identity associations.

8. The method of claim 7 further comprising providing for a datastore.

9. The method of claim 1, wherein the call is routed to the user terminal connected to the telephone system.

10. The method of claim 1, wherein the telephone number attribute of each of the distributed telephone identity associations comprises a range of telephone numbers.

11. The method of claim 1, wherein the telephone identity associations comprise:
    a first telephone identity association comprising:
        a first telephone number attribute comprising the telephone number of the user terminal, and
        a first telephone system identity attribute comprising an identity of a first telephone system to which the user terminal connects for making or receiving a call, wherein the first telephone system is able to route a call to the user terminal with the telephone number, and
    a second telephone identity association comprising:
        a second telephone number attribute comprising the same telephone number of the user terminal as the first telephone number attribute, and
        a second telephone system identity attribute comprising an identity of a second telephone system to which the user terminal connects for making or receiving the call, wherein the second telephone system is different from the first telephone system, wherein the second telephone system is able to route the call to the user terminal with the telephone number,
    wherein the distributing comprises:
    distributing the first and the second telephone identity associations to each of the plurality of telephone identity association processors of the plurality of telephone systems prior to the routing of the call to the telephone number from any of the plurality of telephone systems to the telephone system identified in the telephone system identity attribute.

12. The method of claim 1, wherein the providing for one or more telephone identity associations comprises:
    receiving a distribution of the telephone identity associations by the telephone identity association processor of the plurality of telephone identity association processors,
    wherein the distributing comprises:
    redistributing said telephone identity associations to each of the others of said plurality of telephone identity association processors prior to the routing of the call to the telephone number from any of the plurality of telephone systems to the telephone system identified in the telephone system identity attribute.

13. A method of receiving telephone identity associations comprising:
    providing for a plurality of telephone identity association processors of a plurality of telephone systems for routing calls;
    providing for one or more telephone identity associations by a telephone identity association processor of the plurality of telephone identity association processors, wherein each of said telephone identity associations comprises a telephone number attribute and a telephone system identity attribute,
        the telephone number attribute comprising a telephone number of a user terminal, and
        the telephone system identity attribute comprising an identity of a telephone system to which the user terminal connects for making or receiving a call, wherein the telephone system is able to route a first call to the user terminal with the telephone number;

distributing said telephone identity associations to each of said plurality of telephone identity association processors of the plurality of telephone systems prior to a routing of the first call to the telephone number from any of the plurality of telephone systems to the telephone system identified in the telephone system identity attribute;

determining that the telephone system, to which the user terminal with the telephone number connects for making or receiving the call, has changed;

establishing communications among said plurality of telephone identity association processors of the plurality of telephone systems, and updating the telephone system identity attributes of said telephone identity associations at each of the plurality of telephone identity association processors of the plurality of telephone systems to comprise an identity of the changed telephone system, prior to a routing of a second call to the telephone number from any of the plurality of telephone systems to the changed telephone system.

14. The method of claim 13 wherein each of the updated telephone identity associations further comprises additional attributes including a time marker to designate the time or date the changed telephone system indicated in said telephone system identity attribute begins to be able to route the second call to the user terminal with the telephone number indicated in said telephone number attribute.

15. The method of claim 13 wherein said updating occurs automatically after a predetermined period of time.

16. The method of claim 13 further comprising providing for a datastore.

17. The method of claim 13, wherein the first call is routed to the user terminal connected to the telephone system.

18. The method of claim 13, wherein the second call is routed to the user terminal connected to the changed telephone system.

19. A telephone identity association comprising:

a telephone number attribute comprising a telephone number of a user terminal;

a telephone system identity attribute comprising:

an identity of a telephone system to which the user terminal connects for making or receiving a call, wherein said telephone system identity attribute indicates the telephone system that is able to route a call to the telephone number indicated in the telephone number attribute to the user terminal, and a time marker to indicate when the telephone system indicated in said telephone system identity attribute begins to be able to route the call to the user terminal with the telephone number indicated in said telephone number attribute, wherein the telephone identity association is one of a plurality of telephone identity associations, wherein two or more of the plurality of telephone identity associations comprise a telephone attribute comprising the same telephone number, wherein the two or more of the plurality of telephone identity associations comprise time markers of different values, wherein any of a plurality of telephone systems determines which of the two or more of the plurality of telephone identity associations applies to the call to the telephone number based on the values of the time markers in the two or more of the plurality of telephone identity associations.

20. The telephone identity association of claim 19, wherein the time marker indicates a creation time for the telephone identity association.

* * * * *